(12) United States Patent
Mort et al.

(10) Patent No.: US 11,747,172 B2
(45) Date of Patent: Sep. 5, 2023

(54) UTILITY METER REGISTER OPTICAL READING DEVICE

(71) Applicant: Deer Technology Ltd., Port Talbot West Glamorgan (GB)

(72) Inventors: Hugh William Mort, Port Talbot (GB); Garry Raymond Jackson, Port Talbot (GB)

(73) Assignee: Deer Technology Ltd., West Glamorgan (GB)

( * ) Notice: Subject to any disclaimer, the term of this patent is extended or adjusted under 35 U.S.C. 154(b) by 0 days.

(21) Appl. No.: 16/758,737

(22) PCT Filed: Oct. 24, 2017

(86) PCT No.: PCT/GB2017/053203
§ 371 (c)(1),
(2) Date: Apr. 23, 2020

(87) PCT Pub. No.: WO2019/081877
PCT Pub. Date: May 2, 2019

(65) Prior Publication Data
US 2020/0370922 A1    Nov. 26, 2020

(51) Int. Cl.
  *G01D 4/00* (2006.01)
(52) U.S. Cl.
  CPC ............ *G01D 4/008* (2013.01); *G01D 4/004* (2013.01)
(58) Field of Classification Search
  CPC .............................. G01D 4/008; G01D 4/004
  See application file for complete search history.

(56) References Cited

U.S. PATENT DOCUMENTS

| | | | |
|---|---|---|---|
| 2002/0163582 A1 | 11/2002 | Gruber et al. | |
| 2004/0027253 A1 | 2/2004 | Marsh et al. | |
| 2005/0035877 A1* | 2/2005 | Kim | H04Q 9/00 340/870.02 |
| 2007/0057814 A1 | 3/2007 | Goldbert et al. | |
| 2011/0121989 A1 | 5/2011 | Roslak et al. | |
| 2011/0205022 A1* | 8/2011 | Cavallaro | G01S 17/14 340/8.1 |

(Continued)

FOREIGN PATENT DOCUMENTS

| | | |
|---|---|---|
| DE | 202005004510 U1 | 9/2005 |
| EP | 0259759 | 1/1988 |
| EP | 1596164 A1 | 11/2005 |

(Continued)

OTHER PUBLICATIONS

International Search Report in International Patent Application PCT/GB2017/053203, of which this application is a national stage entry.

(Continued)

*Primary Examiner* — Thai Q Tran
*Assistant Examiner* — Jose M Mesa
(74) *Attorney, Agent, or Firm* — Wood, Phillips, Katz, Clark & Mortimer

(57) ABSTRACT

A meter reading system comprises a sensor unit (2) containing a first camera (10) and at least a second camera (10'), the first camera focussed on a first area of a meter display (32) and the said second camera focussed on a second area of the meter display (32), the cameras arranged so that the area consisting of said first and second areas can be captured.

29 Claims, 3 Drawing Sheets

(56) References Cited

U.S. PATENT DOCUMENTS

Figure 1:
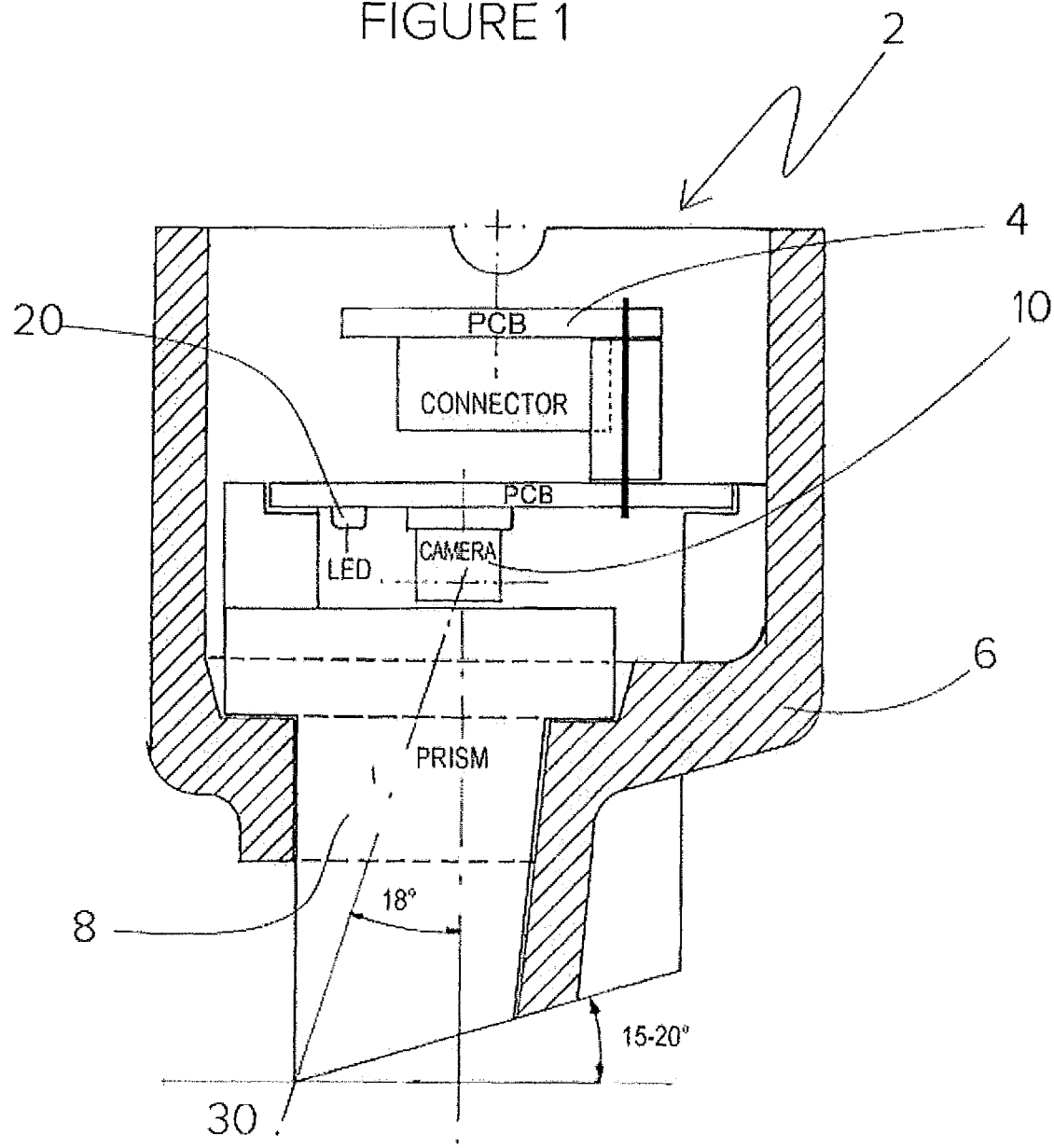
Figure 2:
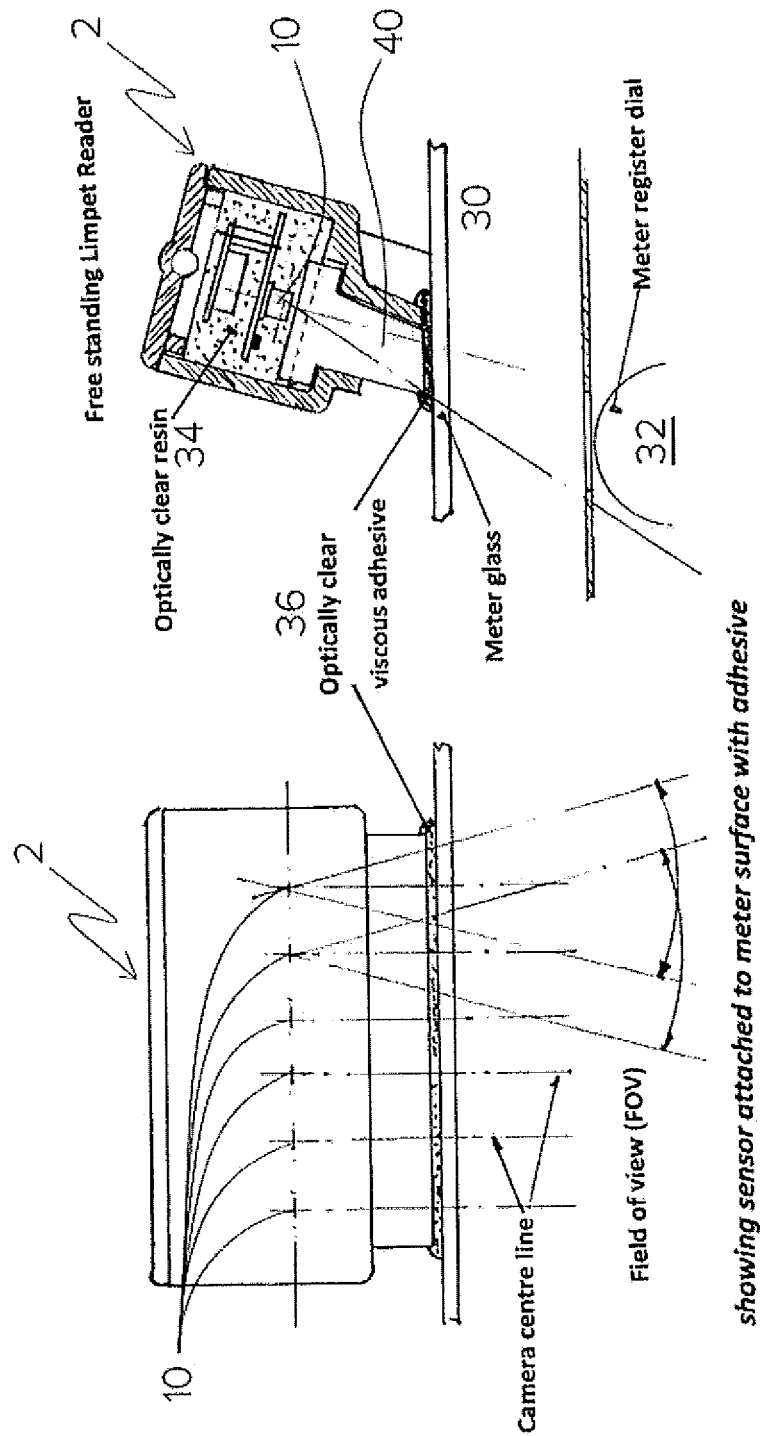
Figure 3:
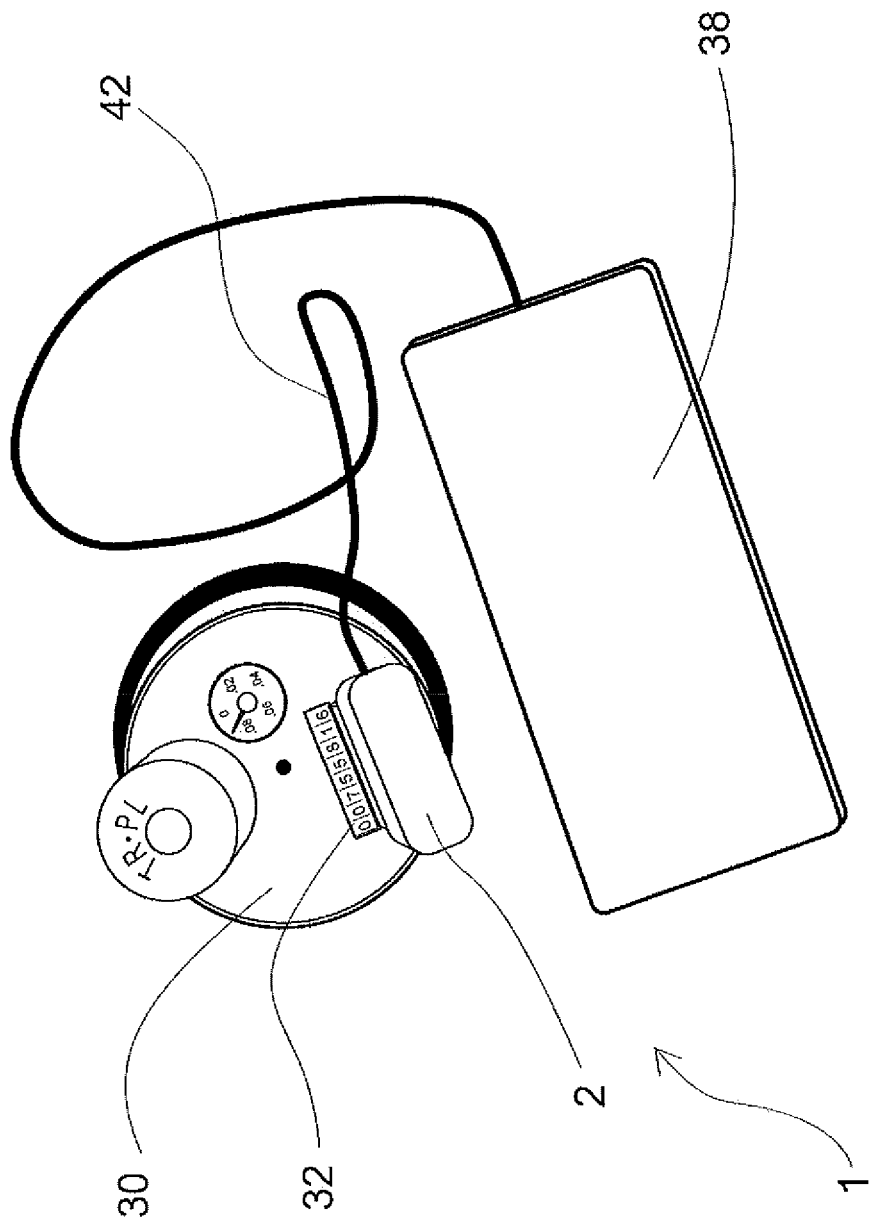

2017/0140482 A1* 5/2017 Salter .................. G08C 19/16
2017/0234709 A1* 8/2017 Mackie .................. H04Q 9/00
73/861.08

FOREIGN PATENT DOCUMENTS

| GB | 2496421 A | 5/2013 | |
|----|-----------|--------|---|
| WO | WO 2013019790 | 2/2013 | |
| WO | WO 2013068770 | 5/2013 | |
| WO | WO-2013068770 A2 * | 5/2013 | ............. G01D 4/008 |

OTHER PUBLICATIONS

Written Opinion in International Patent Application PCT/GB2017/053203, of which this application is a national stage entry.

* cited by examiner

UTILITY METER REGISTER OPTICAL READING DEVICE

CROSS-REFERENCE TO RELATED APPLICATIONS

This application is a National Stage of International Patent Application No. PCT/GB2017/053203 filed Oct. 24, 2017, the entire content of which is incorporated herein by reference.

FIELD OF THE INVENTION

The invention relates to a utility meter register optical reading device.

Background

Utility meters comprising water, gas, and electric meters, use mechanical or electronic registers to record the consumption of the resource by the user.

Manual reading of meters is time consuming and expensive, there are solutions in the market place of automatic meter reading but the majority relate to changing the original meters for a 'new' automatic meter, which again is time consuming and expensive.

The invention is based on taking advantage of the existing stock of analogue metering unit and using a non-invasive miniature reading device, simply attached (i.e. not dismounting, invading or penetrating the existing device in any way) to convert the analogue meters into an Automatic Meter Reader Device.

Utility meters in general and water meters in particular are subject to harsh environments. Some are fitted in underground pits where the meters sometimes covered with mud or flooded with water.

This sort of environment makes it very difficult for an optical sensor to work properly, as the sensor itself, the meter window, or the space between the sensor and the window become clouded in that environment and effective automatic meter reading via optical means can no longer take place.

A lot of scratching and 'pitting' is caused to meters commonly when manual readings are taken, i.e. the dirty surfaces are scraped by the operators in their efforts to view the registers and record the meter readings.

In many cases the windows become translucent and no longer transparent, which makes it almost impossible to take readings, as the numbers behind them cannot be read.

Background in Relation to Optical Sensors for Utility Meters

1. Various automatic meter reading add-on systems are available, some with optical designs but are related to specific meter types and specific groups of meters.
2. Methods to capture and transfer an image of the register are greatly restricted by the limited space available on the surface of the meter for a traditional imaging device such as a single camera, the space around the installation and the size of the actual register.
3. Most optical designs consist of a camera looking at digits via a mirror or prism. These devices primarily cover the meter digits so that a manual reading cannot be taken unless the design incorporates an add-on mechanical device i.e. a lid that can be flipped up (moved) so that a manual reading can take place.
4. Mechanical designs described have disadvantages due to lid not shutting or from other problems condensation, ingress of water, dust etc., thus making these devices inoperable.
5. In principle, an automatic meter reader can work passively, just relying on background light but illumination greatly improves the imaging performance for optoelectronic devices.
6. The inherent difficulties in the design of optical sensor devices relate to the variation of ambient light in all meter situations, therefore these designs should incorporate its own controlled illumination, so that the electronic reading is efficient.
7. Another problem with optical meter reading devices is the back-refection of light from the sensor mirror and/or window. The reflections from plastic or glass can be stronger than the light reflection from the meter digits, this can denigrate the image required for monitoring and can lead to a 'no-reading', which would be unacceptable.
8. Also with optical monitoring devices, a major problem they encounter is again of reflection off the surface that the device is attached to i.e. meter glass. To overcome these reflections the invention incorporates in the designer optical adhesive with similar refractive index to eliminate this effect.
9. Most automatic metering devices available consist of a single assembly which is then attached by various means, this leads to inconsistency and inaccurate positioning of the sensor devices.
10. Another major problem is in the attachment of the device to the meter in confined spaces i.e. in underground meter boundary boxes. Also it must be noted that installations of the system can take place in environmentally harsh conditions.
11. Single image sensor would be used in association with suitable optics designed to ensure that the resulting image contains the required footprint i.e. of short height-long length, thus the necessity for relatively large focal length/prism. In most applications this is not a problem but in the case of a utility meter this poses a significant practical difficulty due to the small meter surface available and the often restricted installation space.
12. The architecture is such that the number of image sensors (cameras) that form the sensing area is not limited or restricted. This scalable design allows for sensors to be realised to suit varying installation requirements whilst still maintaining the characteristically minimal surface footprint and height of the invention.

DESCRIPTION OF THE INVENTION

The invention relates to meter reading devices, in particular interest to a limpet-type meter reader units.

The invention relates to an optoelectronic sensor system 1 that can monitor (or read) metering devices by recognising and transferring their counter 32 images at timed intervals in the form of electronic data.

The aim of the invention is to provide a miniaturised meter reading device 2 that can be attached to the lens or window 30 of the metering unit in order to obtain an image of the register 32 containing the full array of numbers so that a complete meter reading image can be produced which can be used for billing purposes and legally binding billing documents.

The problem with miniaturisation is that existing miniature cameras that can capture the images have viewing fields that need a minimum focal distance in order to capture the full array of numbers. This minimum focal distance and angle capture, therefore, poses a constrain that limits the minimisation of the dimensions of the optical reading head, as well as the set-up distance between the window of the meter unit and the lens of the miniature camera.

The inventors have overcome this problem, by using a plurality of miniature cameras 10, which instead of focusing on the whole array, as common in the art, are each focussed solely, either on a single number, or a small area of the counter array 32. This in turn, allows the distance between the meter window and the lens of the miniature cameras to be reduced dramatically, therefore enabling a breakthrough in the existing barrier preventing further miniaturisation with the bulk of the reading head 2 now being able to lie within a small distance of the meter window 30.

The shorter distance, achieved between the camera and the meter window, now enables the bulk of the equipment of the sensor head 2 to be on and near the surface of the metering unit, without the need of using brackets or further fixings. This provides greater freedom and possibilities during installation, which proves a great advantage in the constrained space where water meters normally reside.

An unexpected result of bringing the cameras 10 so close to the meter window 30 is that This novel arrangement permits direct line of sight image capturing and avoids having to use additional special wide angle lenses or reflecting prisms interposed between the camera lens and the meter window 30, and this in turn reduces the number of undesired reflexions, which may jeopardise the capture of images.

Water meters are generally placed in spaces with no light or very poor lighting conditions. In those conditions, the cameras which capture the images need a light source to guarantee adequate image readings. The use and positioning of the light sources presents serious challenges, as it is the cause of undesired reflections, which are augmented when extra wide angle lenses or reflective prisms are used. The avoidance of those types of lenses or prisms enabled by the proposed arrangement greatly reduces the magnitude and number of reflexions.

In the preferred embodiment, the sensor device incorporates its own controlled illumination source. Using multiple LED sources 20, of potentially different frequencies, in different spatial positions, for complex dynamic multi-spectral illumination. This provides high quality images with minimum specular reflection and great contrast, ideal for image processing that may include local or remote OCR processing. In some embodiments the LED light sources 20 are pointed in a direction laterally offset with respect to the direction to which the camera is pointed. A plurality of light sources 20 can be used with a plurality of cameras 10.

Once received, the individual images of each camera can be processed and stitched together using conventional image stitching software to form a single meter reading image.

The process described solves the problem of imaging a utility meter register 32 whilst maintaining an ultra-small footprint on the surface of the meter. This is achieved using multiple adjacent image sensors 10 with over lapping fields of view of the register 32. The images are post processed to create a single, high quality register image. This method effectively creates a large field of view whilst still remaining extremely close to the meter surface.

The sensor head 2 can be attached via viscous optically clear adhesives 36, which allows a quick and easy installation in difficult and unpleasant environments, and the removal of the reader if, or when required. This ease of installation facilitates the adaption of the sensor head for different types of metering units.

Disclosed is a technique to rapidly and accurately secure a utility meter register reading device to the surface 30 of a utility meter that repairs/eliminates existing meter surface defects whilst protecting the optical path from the register to the sensing device This invention further relates to a method to correct any pre-existing utility meter surface contamination and defects to create a permanent high quality optical path to the register for attachment of an optical meter reading sensors.

Utility meters are often located in harsh environments which results in problems reading the registers manually or automatically. Common problems may include surfaces obscured with contaminants such as water and mud as well as meter surfaces damaged and scratched.

To create an image of a utility meter register, scratches and contaminants must first be removed and then prevented from reoccurring once the image sensing device has been installed. Practically this must be achieved as quickly as possible in potentially difficult installations.

The Solution:

The meter must be first cleared from fluids and solids as for a traditional, manual reading, so that a specific optical viscous adhesive 36 can be applied to the meter surface 30. A custom designed, optically clear, injection moulded part 40 is then placed on the meter surface.

Once alignment has been achieved by the installer, the adhesive removes all surface defects and the part provides a near perfect optical path between meter surface and imaging device. The optical path is now through the injection moulded part 40 to the meter surface 30, subsequent fluid or solid contamination will have no effect. The injection moulded part 40 has been designed to create an angle between the meter surface and the imaging sensor. This allows the part to be bonded to the surface whilst importantly preserving the capability for direct manual readings. Various types of optically clear adhesives 36 can be used for different uses, such as:

For high speed curing, a UV type adhesive is recommended.

For ease of installation, a two part adhesive is suggested instead.

For ease of installation and then for clean removal at a later date from meter surface, what is recommended is a specific optically clear adhesive compatible with the two surfaces, designed so that the sensor reader unit is split from the utility meter surface without any adhesive on prism surface.

This solution provides a substantially clean line of sight between the sensor device and the meter window and prevents the impact foreign matter occluding the line of sight.

Using angled prism or lens 40 allows the sensor head to be positioned and fixed below or above the utility meter register window 30, so that a manual reading can be taken by an operator placed directly in front of the metering window 30, so that in effect, the sensor device 2 doesn't interfere with frontal/perpendicular direct line of sight operator reading of the metering counter 32.

The sensor units 2 can be used with clear extension pieces 40 to facilitate widespread adoption.

Initial placement of sensor head (reader) 2 during installation can be aided by using a tablet or smart device that provides local, real time image feedback.

The tablet or Smart device allows the operator to, in the first instance ensure the Reader unit 2 is aligned horizontally and vertically by continuously transmitting the image from the Reader unit 2 of the Utility meter register 32 to the Tablet or Smart device screen and to adjust if necessary until the display is located in its correct position.

Minor incorrect placements due to rotation and shifts of image can be corrected by image processing.

Yet a further breakthrough towards miniaturisation is achieved by the way the image data is sent to the main register processor. The individual images captured by each camera are much smaller than the whole image (file) necessary to capture the whole array of numbers that compose the meter reading. Data is sent from sensor unit 2 to a register processor 38 over a data link 42, preferably a high speed differential serial twisted pair data link, using two of the wires in the core interconnecting cable. In the preferred embodiment, only one camera 10 is awake at any time streaming data down this link. A signal from the register processor 38 to the sensor head 2 tells it which camera to activate. To take a complete data set of images, the register processor 38 sequentially tells the sensor 2 to activate each in turn creating a sequential pipe line of images going down the cable 42. The nature of this application (a slow target to be imaged) means that using this process, the amount of electronics is greatly reduced on the sensor head 2. The embodiment described shows a register processor 38 which is remote from the sensor head; The skilled person, nevertheless, would envisage that processing functions could be performed solely on the sensor head, solely on a remote unit, or distributed between the sensor head 2, the register processor 38 or another location with a data link to either of these.

It could have been done with individual data channels but the interconnecting cable 42 would have gone from low cost 3 mm core to 16-20 core, thick and expensive. The electronics on the sensor head 2 and the register processor 38 would need to grow significantly to support each channel, thus the advantage of the technique shown over the conventional approach.

The register processor 38 can typically comprise a power source (battery or mains), memory and a wired or wireless communication device. In more advanced embodiments it can further incorporate RFID, IoT (internet of Things) or smartphone technologies.

In regards to the illumination, producing high contrast images of a target by controlling illumination is regarded as the best approach to increase the success of late image processing operations, such as optical character recognition. It is a common misconception that increasing the amount of processing power and algorithm complexity at the image processing stage will correct for poor source images. Our invention develops this concept to provide the potential for producing optimal source images.

Each camera has an associated light source 20, preferably a wide angle LED source. Each LED 20N can have a different frequency and can be activated independently of each other, and independently of the camera 10N that has been selected. This allows control of the spatial position of the illumination relative to the camera that is currently imaging as well as the frequency of that illumination. The illustration below is used to clarify the two examples provided below (L:Light; C:Camera)

L1 L2 L3 L4 L5 L6
C1 C2 C2 C4 C5 C6

Example 1

IR (Infra-Red) illumination has been found to provide superior contrasting images and thus performance when the registers 32 digits are 'black on white' or 'white on black' as well as providing the greatest level of insensitivity to any ambient lighting when a simple plastic IR curoff filter is placed between camera and prism. However, many registers 32 also contain fractional units that are often 'red on black' or 'red on white'. IR illumination in this case provides very poorly contrasted images. Thus if the red digits were within the field of view of cameras C5 and C6 then L5 and/or L6 would be fitted with BLUE LEDs

Example 2

If a particular installation suffered from a significant degree of specular reflection at specific points on the register surface, due to meter construction or installation environment, then controlling the LEDs in a specific spatial pattern can help reduce this issue. The pattern and sequence of LEDs to minimise this issue will need to be determined by examining the content of the individual returned images, either manually, or automatically with a suitable algorithm running to detect localised saturation.

The final step to create a single high quality, high resolution, high contrast, complete register image is to stitch and blend the separate images together. This image can then be image processed locally or remotely to automatically determine the register reading, i.e. optical character recognition. With only a digit subset and optimised high quality source images this stage has maximum chance of robustly producing accurate results, suitable for billing or legal purposes.

Advantages of the Invention

Miniaturisation
    Miniaturising using multiple cameras 10 to reduce focal distance, thus size of sensor placed on meter surface whilst creating a minimally distorted super resolution image.
    Further miniaturising by separating the image sensors needed at the meter surface from the processing and communications sub-systems needed to send the images to the meter owner (or user) party. The link between them is robust high speed digital over a cable 42 with only 5 cores and 3 mm thick at lengths of up to 20 m.

Optical Considerations
    Optically optimal design specifically for utility meters.
    Correct for surface defects (via optical adhesives 36)
    Protect optical path post installation (camera to meter via solid clear prism)
    Angled on meter surface to support placing below register to allow manual register reading as well as from the camera.

Illumination
    Sensor head with multiple illumination sources, at different positions across the length of the meter and at different frequencies.
    Allows multiple images to be produced (and then sent to the owner) from the same cameras 10 but with different illumination sources 20 selected to
    Enable multi spectral imaging for optimal contrast under different installation conditions (environmental and meter register colours)
    Reduce the significance of any secular reflection.

The design of the miniature reader body provides features that:
    Facilitate the 'ease of attachment' required for the physical fitting of the unit as a separate device to the existing meter in environmental unfriendly conditions and confined spaces.

Facilitate the ease of adaptation of the Miniature Meter Reader Device 2 to different kinds of meters.

The process and technology advancement described in this claim solves the problem of imaging a utility meter register whilst maintaining an ultra-small footprint on the surface of the meter. This is achieved using multiple adjacent image sensors 10 with over lapping fields of view of the register. The images are post processed to create a single, high quality register image. This method effectively creates a large field of view whilst still remaining extremely close to the meter surface.

Provides a substantially clean/direct line of sight between the optical sensor camera 10 and the meter window 30 with the use of optically clear resins and adhesives 36, where the potential impact of foreign matter occluding the line of sight or the meter window is eliminated and, Simultaneously provides means for manually reading (by an operator) the counter 32 behind the meter window 30, without need of interfering with the AMR (Automatic Meter Reading) device 1.

The invention does away with brackets or holding attachments and relies purely on designed optical adhesive 36 for accurate positioning and fixing of the Miniature Meter Reader Sensor 2.

SUMMARY OF THE INVENTION

The invention shows a non-invasive (nothing is plugged into the device), miniature, low aspect Image Sensor 'Limpet' type device 2 that can be positioned accurately with ease to a utility meter surface 30, so as to send high quality images of the consumption register for accurate profiling and billing purposes to the meter owner.

Furthermore, the object of the invention is to provide an optoelectronic meter reading system to eliminate the disadvantages mentioned above with particular emphasis on background light, light reflections and to be able supplementary fix the device without brackets or fixings to the various types of meters in their specific environmental conditions.

STATEMENT OF INVENTION

The reading device that uses multiple image sensors combined with sequential image processing. This design greatly reduces the size of the supplementary device to give it high versatility for simple attachment to the varying range of size and type of Utility Meters.

The invention is directed to a meter reading system comprising a sensor unit 2 containing a first camera 10 and at least a second camera 10', the first camera focused on a first area of the meter display and the said second camera focussed on a second area of the meter display, the cameras arranged so that the total area consisting of said first and second areas can be captured.

The invention is further directed to a meter reading system comprising a low aspect sensor unit, where the miniaturisation of the system is achieved by reducing the optical path needed to image a surface by actually increasing the amount of image sensors, or cameras.

The invention is further directed to a meter reading system comprising a sensor unit 2 and a register processor unit 38, where the sensor unit comprises a first camera 10 and a second camera 10', the first camera focused on a first area of the meter display and the said second camera focussed on a second area of the meter display, where the individual images captured by each camera are partial images—arranged so that when juxtaposed comprise a larger image—and where image data from each image is sent sequentially from sensor unit 2 to a register processor 38 over a data link, whereby the number of cores in the data link 42 or the complexity of the processing unit in the sensor unit 2 are greatly reduced.

The invention is further directed to a meter reading system comprising a sensor unit 2 where the sensor unit is attached to the meter window 30 via an optically transparent adhesive 36 which joins a transparent moulded component attached to, or part of the sensor unit to the meter window surface.

The invention claimed is:

1. A meter reading system for reading the meter display of a meter through a meter register window, the meter display comprising a control processor unit; an alphanumeric string, the meter reading system comprising a sensor unit (2) containing a plurality of cameras each having a viewing field and including a first camera (10) and at least a second camera (10'); and a solid prism; the first camera focused on a first area of an alphanumeric string of a meter display (32) and the said second camera focused on a second area of the same alphanumeric string of the meter display (32), the cameras arranged so that the area consisting of said first and second areas can be captured, wherein the distance from each camera to the meter display is such that the viewing field of each camera captures only part of the full alphanumeric string, wherein the sensor unit is arranged to be connected to the meter and fixed to the meter register window via said solid prism through which the cameras are arranged to view the meter display, whereby the said cameras (10, 10') are arranged in a position offset from an area directly in front of the meter display (32), so that most of the meter display (32) remains uncovered and visible from the front of the meter display, enabling simultaneous manual reading by meter reading operator, wherein the solid prism (40) is attached to the meter register window (30) of a metering unit via an optically transparent adhesive (36), wherein an area between the cameras (10) and the solid prism (40) is filled with optically clear resin (34), wherein the control processor unit is arranged to obtain a display (32) reading by stitching or juxtaposing image stitching or juxtaposing images each captured by the respective said cameras to create the data of a complete image.

2. The meter reading system of claim 1, wherein the meter reading system further comprises means for sending a signal representative of the camera outputs to an external location.

3. The meter reading system of claim 1, where the meter display has upper and lower edges, positioned above and below the readable data, and the solid prism (40) is connected on to the upper and/or lower edges of the meter display (32).

4. The meter reading system of claim 1, wherein the optically transparent adhesive (36) has a refractive index which is similar to that of the meter register window (30), whereby reflections within the meter reading system can be avoided or reduced.

5. The meter reading system of claim 1, wherein the optically transparent adhesive is one of the group comprising a UV adhesive and a two-part adhesive.

6. The meter reading system of claim 1, wherein the optically transparent adhesive is a two-sided-adhesive tape, one side adhered to the meter register window 30 and the other to the solid prism (40).

7. The meter reading system of claim 1, wherein there is a direct line of sight between the cameras (10) and the meter register window (30) achieved by using optically clear resins and adhesives, whereby the potential impact of foreign matter occluding the line of sight or the meter register window is eliminated.

8. The meter reading system of claim 1, wherein the sensor unit (2) comprises at least two light sources (20).

9. The meter reading system of claim 8 wherein the at least two light sources (20) produce radiation at different frequencies.

10. The meter reading system of claim 8, wherein at least one light source is a source of infra-red radiation.

11. The meter reading system of claim 8, wherein the meter reading system includes a light source for each camera.

12. The meter reading system of claim 8, comprising processing means connected to the said cameras and said light sources, arranged to take multiple images of the same display readings, using different light sources, frequencies, or spectrums.

13. The meter reading system of claim 8, wherein the sensor unit is connected to the meter display via the solid prism (40) through which the cameras are arranged to view the meter display and wherein an area between the light sources (20) and the solid prism (40) is filled with optically clear resin (34).

14. The meter reading system of claim 1, further comprising a third camera (10") focused on a third area of the meter display 32.

15. The meter reading system of claim 14 further comprising a fourth camera (10") focused on a fourth area of the meter display 32.

16. The meter reading system of claim 15 further comprising a fifth camera (10") focused on a fifth area of the meter display 32.

17. The meter reading system of claim 1, wherein the meter reading system includes a camera for each alphanumeric character of the meter display.

18. The meter reading system of claim 1, wherein the sensor unit and the control processor unit are physically separate and are connected by a data connection.

19. The meter reading system of claim 18, wherein the data connection is a cable.

20. The meter reading system of claim 19 wherein the cable for handling the data has less than sixteen cores.

21. The meter reading system of claim 20 wherein the cable for handling the data has only five cores.

22. The meter reading system of claim 19, wherein the cable handling the data is a high speed differential serial twisted pair data link.

23. The meter reading system of claim 1, wherein the control processor unit is arranged to trigger the cameras in sequence, creating a sequential pipe line of image data, whereby image data can be handled with fewer electronic resources that would otherwise be needed with simultaneous triggering.

24. The meter reading system of claim 1, wherein the meter reading system is a water meter reading system suitable for use in an environment where a meter is covered with mud or flooded with water.

25. The meter reading system of claim 1, wherein the meter reading system includes an interface to transmit the reading data to a local device.

26. A meter reading system for reading an alphanumeric display of a meter through a meter register window, the meter reading system comprising a control processor unit; a sensor unit containing a plurality of cameras each having a viewing field and arranged side by side so as to be directed at one or a plurality of alphanumeric characters in a single string; a solid prism; and means for sending a signal representing the reading to an external location, wherein the distance from each camera to the meter display is such that the viewing field of each camera captures only part of the full alphanumeric string, wherein the sensor unit is arranged to be connected to the meter and fixed to the meter register window via said solid prism through which the cameras are arranged to view the meter display, whereby the said cameras (10, 10') are arranged in a position offset from an area directly in front of the meter display (32), so that most of the meter display (32) remains uncovered and visible from the front of the meter display, enabling simultaneous manual reading by meter reading operator, wherein the solid prism (40) is attached to the meter register window (30) of a metering unit via an optically transparent adhesive (36), wherein an area between the cameras (10) and the solid prism (40) is filled with optically clear resin (34), wherein the control processor unit is arranged to obtain a display (32) reading by stitching or juxtaposing images each captured by the respective said cameras to create the data of a complete image.

27. A meter reading system for reading the meter display of a meter through a meter register window, the meter display comprising an alphanumeric string, the meter reading system comprising a control processor unit; a sensor unit (2) containing a first camera (10) and at least a second camera (10') each having a viewing field; a solid prism; and, the first camera focused on a first area of a meter display (32) and the said second camera focused on a second area of the meter display (32), wherein the sensor unit is arranged to be connected to the meter and fixed to the meter register window via said solid prism through which the cameras are arranged to view the meter display, the cameras arranged so that the area consisting of said first and second areas can be captured, wherein the said cameras (10, 10') are arranged in a position offset from an area directly in front of the meter display (32) and connected to the meter register window (30) on the periphery of the meter display (32) via the solid prism (40), so that most of the meter display (32) remains uncovered and visible from the front of the meter display, enabling simultaneous manual reading by meter reading operator, wherein the distance from each camera to the meter display is such that the viewing field of each camera captures only part of the full alphanumeric string, wherein the solid prism is attached to the meter register window (30) of a metering unit via an optically transparent adhesive (36), wherein an area between the cameras (10) and the solid prism (40) is filled with optically clear resin (34), wherein the control processor unit is arranged to obtain a display (32) reading by stitching or juxtaposing images each captured by the respective said cameras to create the data of a complete image.

28. The meter reading system of claim 8, wherein at least one light source is a source of infra-red radiation and at least another light source is a blue LED.

29. The meter reading system of claim 1, wherein each camera is focused solely on either a single number of the alphanumeric string or on an area which is less than all of the alphanumeric string.

* * * * *

UNITED STATES PATENT AND TRADEMARK OFFICE
CERTIFICATE OF CORRECTION

| | |
|---|---|
| PATENT NO. | : 11,747,172 B2 |
| APPLICATION NO. | : 16/758737 |
| DATED | : September 5, 2023 |
| INVENTOR(S) | : Hugh William Mort and Garry Raymond Jackson |

It is certified that error appears in the above-identified patent and that said Letters Patent is hereby corrected as shown below:

In the Claims

Column 9, Line 29, Claim 15, should read:
15. The meter reading system of claim 14 further comprising a fourth camera (10''') focused on a fourth area of the meter display 32.

Column 9, Line 32, Claim 16, should read:
16. The meter reading system of claim 15 further comprising a fifth camera (10'''') focused on a fifth area of the meter display 32.

Signed and Sealed this
Seventh Day of November, 2023

*Katherine Kelly Vidal*

Katherine Kelly Vidal
*Director of the United States Patent and Trademark Office*